United States Patent [19]
Baker

[11] 4,015,409
[45] Apr. 5, 1977

[54] COMBINED SICKLE GUARD UNIT AND ATTACHMENT MOUNTING MEANS

[76] Inventor: Clinton F. Baker, 109 S. 8th St., Fredonia, Kans. 66736

[22] Filed: Aug. 11, 1975

[21] Appl. No.: 603,376

[52] U.S. Cl. .............................................. 56/312
[51] Int. Cl.² ...................................... A01D 55/10
[58] Field of Search ............ 56/312, 313, 318, 257, 56/14.4, 208, 307–311, 10.2, 10.4, DIG. 15, DIG. 10

[56] References Cited
UNITED STATES PATENTS

| | | | |
|---|---|---|---|
| 2,025,497 | 12/1935 | Crumb et al. | 56/312 |
| 3,313,095 | 4/1967 | Gaterman | 56/312 |

*Primary Examiner*—J.N. Eskovitz
*Attorney, Agent, or Firm*—Robert E. Breidenthal

[57] ABSTRACT

An attachment arm pivotally mounted on a combine to project forwardly from below the sickle cutter for limited vertical swinging movement to accommodate ground surface irregularities, wherein the arm is detachably pivoted to an individual sickle guard unit by structure spaced from and independent of the detachable connection of the guard unit to the combine, whereby the sickle guard unit serves to couple the arm to the combine in addition to its customary function, and enables the arm to be pivotally secured to and removed from the combine without disturbing the connection of the guard unit to the combine.

17 Claims, 6 Drawing Figures

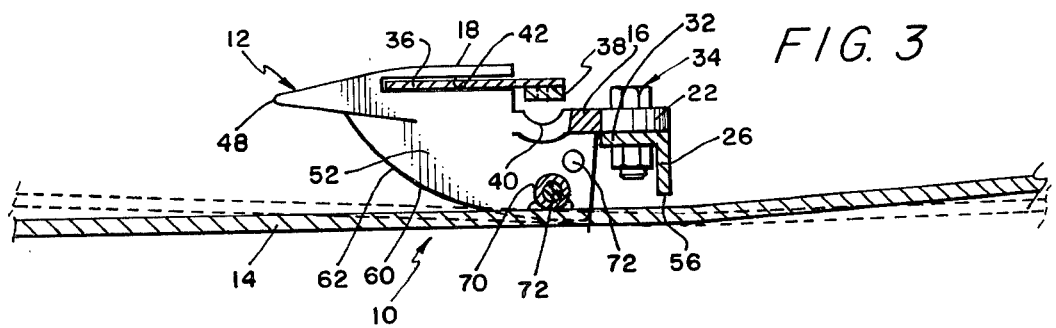
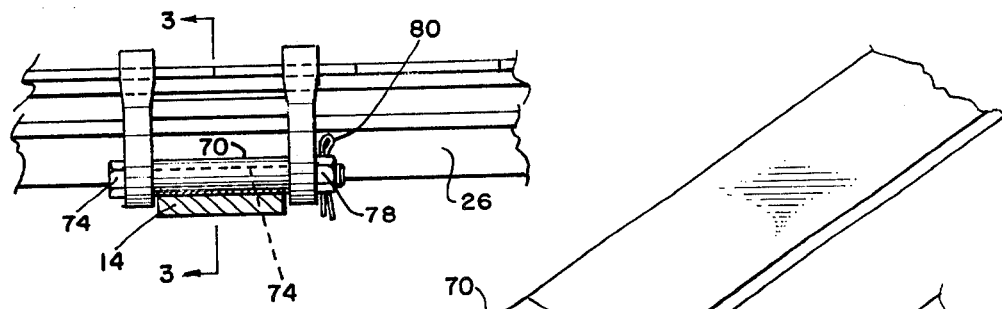
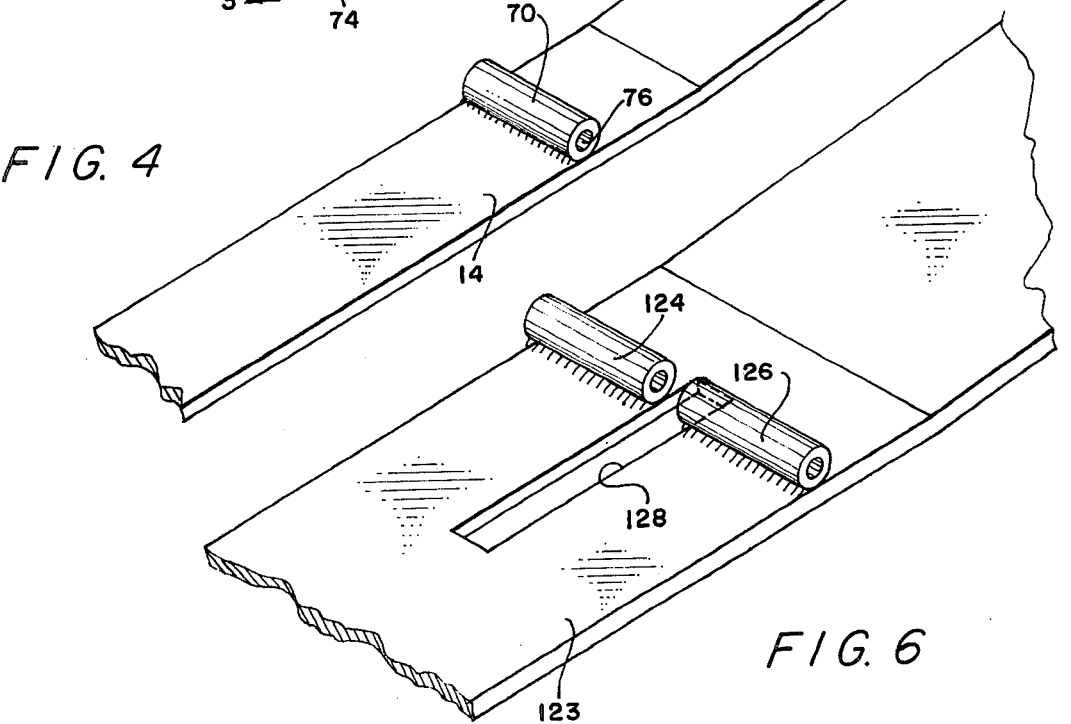

COMBINED SICKLE GUARD UNIT AND ATTACHMENT MOUNTING MEANS

The present invention relates to new and useful improvements in harvesting machines equipped with attachments disposed in advance of the sickle cutter of such machines, and pertains more specifically to the detachable and pivotal mounting of such attachments on such machines. The present invention has special utility in harvesting machines such as that shown in my U.S. Pat. No. 3,812,661 which issued May 28, 1974.

The utility and efficiency of harvesting machines such as combines can be enhanced under some conditions or with respect to some kinds of crops (particularly row crops such as, for example, soybeans) by the provision of structure that projects forwardly of the sickle cutter means conventionally included in such agricultural machines. Such forwardly disposed types of structure are also usually required to be closely disposed to the ground surface and for this reason are pivotally connected to the combine for vertical swinging movement to accommodate the relative rise and fall of the ground surface in advance of the approaching sickle cutter means. For related reasons it is usual for such structures to extend forwardly of the sickle cutter means from beneath the reciprocating knife of the sickle cutter means.

A difficulty or inconvenience of substantial magnitude that is encountered in providing the desired detachable pivotal connections for the forwardly projecting structures resides in the necessity for having to somehow make a permanent modification of extent combines as marketed, or alternatively, by either utilizing the bolts connecting the sickle guard units to the combine to additionally attach pivot means, or to somehow clamp the pivot means between the combine and the sickle guard units.

Modification of the basic combine can be expensive; may raise markedly different specific engineering problems from one brand or make of combine to the next; and might reduce the resale or trade-in value of a combine as some potential purchasers either do not desire the feature or view the modification as damaging or harmful. Utilizing the same bolts to connect the guard units and the attachments, as well as clamping the attachments between the guard units and the combine requires a considerable amount of time and effort to secure or detach the attachment, and may require extra care to make sure that the proper relationship between the guard unit and the other guard units and the reciprocating knife is not lost. Modification of the basic combine may not simplify and might even make the time and effort of attaching and detaching the pivot means all the more demanding.

It is the paramount object of the present invention to overcome the difficulties outlined above, namely, to afford a quick and easy way to detachably pivot a forwardly projecting arm on a combine for vertical swinging movement while avoiding any necessity for modification of the basic combine, and while also avoiding any necessity for disturbing the mounting of the sickle guard units on the combine.

Broadly, the present invention involves replacement or substitution of conventional sickle guard finger units with units specially adapted for direct pivotal connection the the forwardly projecting structure. Only such conventional guard units need to be detachably replaced with modified units as those that correspond in numbers and spacing with the number and spacing of forwardly projecting structures as are to be detachably and pivotally mounted on the combine to project forwardly from beneath the reciprocating sickle knife.

More specifically, the instant invention involves a sickle guard unit comprising a plurality of parallelly spaced and forwardly projecting guard fingers joined integrally at their rear ends by a horizontally extending bar, said mounting bar being provided with means for enabling the mounting of the unit on a horizontal support, each of said guard fingers including a depending medial rib, and said ribs having openings therethrough that are aligned in parallelism to and disposed at a height below that of the mounting bar.

The invention will be best understood in the light of the following description of preferred embodiments thereof, such description being presented in conjunction with the accompanying drawings, wherein:

FIG. 2 is a vertical sectional view taken upon the plane of the section line 2—2 of FIG. 1;

FIG. 3 is a vertical sectional view taken upon the plane of the section line 3—3 of FIG. 2;

FIG. 4 is an isometric and fragmentary view of the attachment arm and shows the pivot bearing fixed to the same;

FIG. 5 is a view of similar character to FIG. 1, however, showing a triple rather than a dual sickle guard finger unit pivoted to an attachment arm; and, wherein FIG. 6 is a broken isometric view of the attachment arm of FIG. 5.

Figure 1:
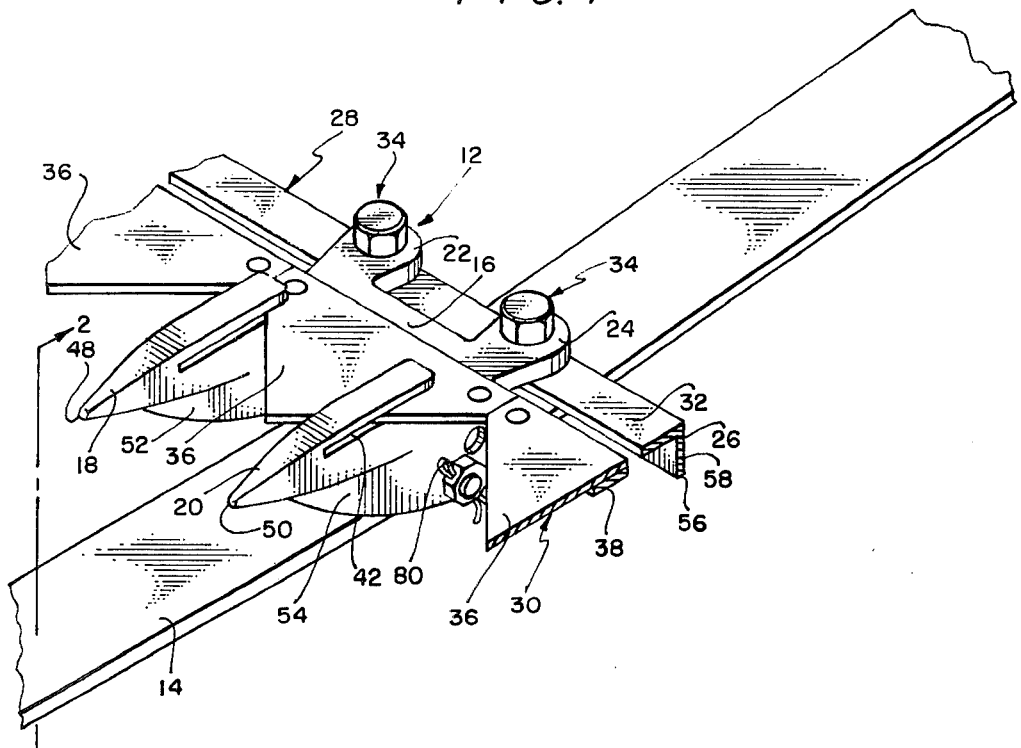
FIG. 1 is an isometric view of a sickle guard unit shown bolted to a fragmentarily shown fixed frame element of a combine and pivotally coupled to a fragmentarily shown forwardly projecting attachment arm.

Referring now to the drawings wherein like numerals designate like parts throughout the various views and directing attention initially to the form of the invention shown in FIGS. 1–4, the reference 10 designates generally the combined sickle guard and attachment mounting construction, the same being comprised of a sickle guard finger unit 12 and an elongated attachment arm 14.

The sickle guard unit 12, except as specifically pointed out hereinafter, is quite similar to sickle guard units in use and presently on the market, the same being integral and comprised of a mounting bar 16 having at its ends a pair of parallelly spaced and forwardly extending guard fingers 18 and 20 normal thereto. The mounting bar has rearwardly extending mounting ears 22 and 24 at its opposite ends that overlie an angle iron 26 that is a fixed structural frame member and component of a combine designated generally at 28 that extends the entire length of a sickle cutter means designated generally at 30. The ears 22 and 24 are detachably mounted on the horizontal leg 32 of the angle iron 26 by conventional nut and bolt means 34 extending through aligned openings in the ears 22 and 24 and the iron 26.

It will be readily understood by those skilled in the art that the sickle cutter means 28 and the angle iron 26 on which it is mounted has a substantial length corresponding to the width of a swath cut by a combine and that the sickle cutter means 30 includes a plurality of guard units 12 spaced along the angle iron 26 as such units may typically be only four inches long from end to end of the bar 16. The plurality of units 12 provide a series of forwardly projecting guard fingers, such as those shown at 18 and 20, that serve as stationary teeth that coact with a series of movable teeth or sections 36 that are conventionally fastened to a reciprocatingly driven knife bar 38. The sickel knife constituted of the bar 38 and the series of sections 36 mounted thereon coact with the guard fingers 18 and 20 in an entirely conventional manner with the sickle bar 38 overlying concave portions of the latter forwardly of the mounting bar 16, with the sections 36 sliding within rearwardly opening horizontal slots 42 in the upper portions of the fingers 18 and 20.

The structure thus far described and its functions are entirely conventional, are in wide use, and are well known.

The guard unit 12 departs from the conventional in that instead of being of a vertical height such that the bottom thereof is virtually coincident with the bottom of the bar 16 with the lower edges of the guard fingers smoothly extending forwardly therefrom to terminate at the forward tips 48 and 50 of the guard fingers 18 and 20, the guard fingers 18 and 20 have integral depending keel-like vertical flanges or medial ribs 52 and 54, respectively.

The medial ribs 52 and 54 are substantially flat and parallel, and extend forwardly from approximately underlying the mounting bar 16. The ribs 52 and 54 are of substantial height and extend downwardly to a lower edge spaced well below the knife bar 38 and preferably also below the lower edge 56 of the vertical leg 58 of the angle iron 26. Also, as best shown in FIG. 3, the lower edges 60 of the ribs 52 and 54 smoothly curve upwardly and forwardly as at 62 to merge with undersides of the fingers 18 and 20 properly at positions adjacent the points 48 and 50 thereof.

The ribs 52 and 54 are formed integrally with the guard unit 12 and the entire unit 12 is made of the same materials (iron or steel) as customarily used in common guard finger units.

Means is provided for pivotally securing the attachment arm 14 to the guard unit comprising a steel tubular bearing member 70 welded to the upper side of the steel arm 14, such bearing having a length corresponding to the spacing of the ribs 52 and 54, the ribs 52 and 54 are provided with two pairs of aligned openings therethrough such as the pairs indicated at 72. The bearing 70 is placed in between the ribs 52 and 54 with the bearing 70 in alignment with one of the pairs of openings 72 and a pivot pin in the form of a headed bolt 74 is removably passed through the openings 72 and the opening 76 of the bearing 70. The bolt has a threaded end upon which a nut 78 is threaded and releasably retained against inadvertent removal by a cotter pin 80.

The attachment arm 14 when detachably mounted as described above has vertical swinging movement about a horizontal axis parallel to the angle iron 26 and the forward end of the arm 14 is limited in its downward movement by engagement of the arm encountering the lower edge 56 of the angle iron 26. Use of the other and alternative pair of openings 72 for the pivot pin 74 affords a choice as to the extent of such limit as the alternative pair of openings is upwardly and rearwardly of the pair of openings 72 illustrated in operative association with the bearing 70.

It will be noted that the rearward extent of the arm 14 is substantially greater than that required in order to enable limiting engagement with the angle iron 26 mentioned above, and this is to afford, if desired, a limiting action upon the rearward end of the arm 14 engaging some other, but unshown, component of the combine such as the underside of the platform as in my patent mentioned previously. Otherwise the excess rearward extent of the arm is cut off.

With regard to my earlier patent, it should be mentioned that the efforts culminating in the instant invention were initiated in order to provide a convenient and rapid way to mount and dismount the crop saving attachment commonly now called "bean pans" of such patent, it having been found to be quite inconvenient, indeed quite a chore, to accomplish such a task which entailed not only initially conforming to a multiplicity of combine makes and styles and then having to disturb the sickle guard unit mountings. Suffice to say, the present invention can be applied to mount bean pans or many other types of attachments which it is desired precede the advance of the sickle cutter. Obviously the forward end of the arm 14 can be bent back upon itself in the vertical plane through an obtuse angle to provide a row crop lifting structure adapted to accomplish some of the functions taught as being desirable by some of the previously listed U.S. Patents. Such specific forms of arm or specific forms of attachments constituted thereby or mounted thereon do not constitute any part of the invention per se and accordingly are not shown or claimed; mention being made in the interest of suggesting the utility and versatility of the instant invention.

As the desired spacing of arms 14 on the combine may be multiples of the breadth of individual sickle guard units, only those guard units having spacings corresponding to the desired arm spacings have the modified form of guard unit 12 illustrated, and conventional guard units (not shown) as normally supplied with the combine can be retained in their original intervening positions. The conventional units originally positioned at desired attachment arm 14 locations along the length of the angle iron 26 are replaced with modified finger guard units once installed, the combine can be used in exactly the same way and with as great efficiency as before substitution of modified guard units, and additionally, the arms 14 can be speedily and conveniently attached to and removed from the modified units without disturbing the mounting of the guard units.

If ever desired, the original units removed during the substitution can be saved for reinstallation at some later date if it is desirable for any reason to restore the combine to its precise original form.

The modified guard units must, of course, be conformable with the mounting of the units for which they substitute. Because of the comparatively few significantly different forms of sickle guard units (and especially the mounting means provided therefor), it is only necessary to provide and stock a very few different sickle guard units according to the instant invention in order to apply the present invention to the great number of combines now on the market and those still active on the farms of today.

Perhaps one of the chief distinctions or different forms is where the guard units include more than the two fingers of the unit 12. This brings to consideration the modified form of the invention shown in FIGS. 5 and 6 wherein a guard unit having three fingers is involved. Needless to say, the invention as previously described could be practiced with respect to a selected pair of the three teeth, however, it may be considered advantageous to actually utilize more than two fingers.

Accordingly, the reference numeral 100 designates generally a modified three-fingered sickle guard unit, the same including a mounting bar 102 integral with three forwardly extending fingers 104, 106 and 108. The bar 102 is provided with mounting flanges 110 that overlie and are detachably secured to an angle iron 112 that corresponds to the angle iron 26 of FIG. 1 by conventional nut and bolt means 114.

Figure 5:
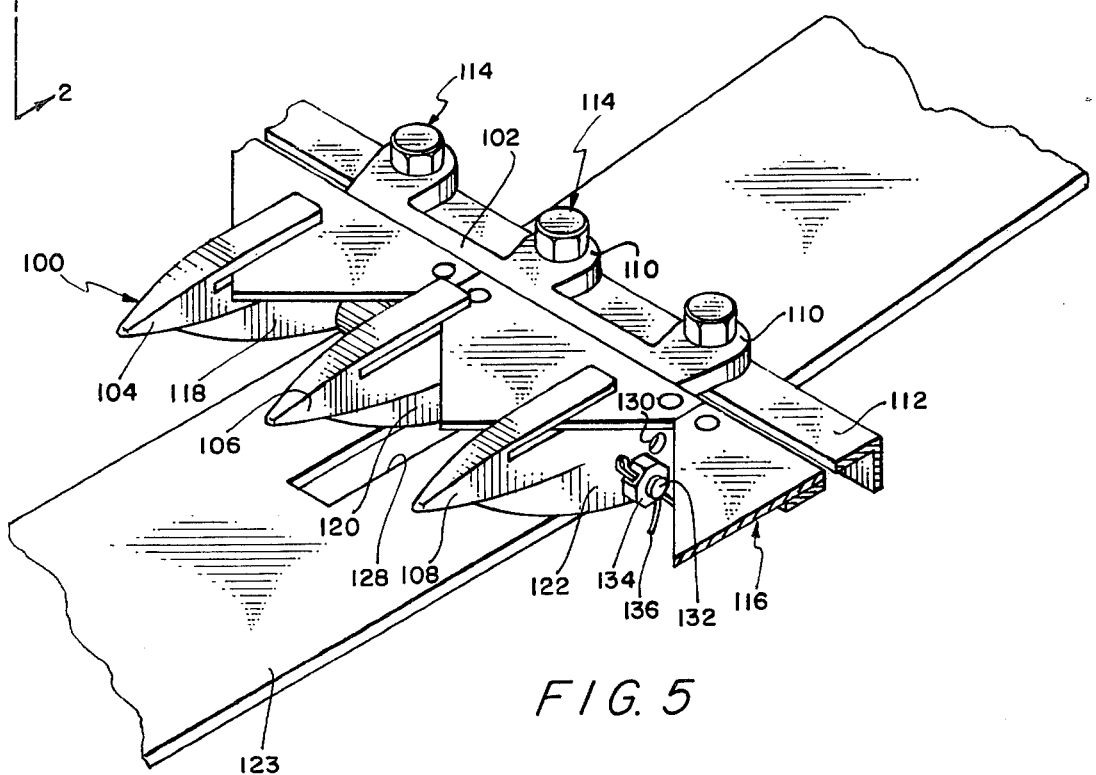

A reciprocating sickle knife means 116 coacts with the guard fingers 104, 106 and 108 in the same manner as the obviously corresponding parts of the previously described embodiment. As thus far described, the embodiment of the invention shown in FIGS. 5 and 6 is competely conventional.

The fingers 104, 106 and 108, as in the case of the fingers 18 and 20, are respectively provided with integral medial ribs 118, 120 and 122 that are substantially identical in form to and bear the same relation to their respective fingers as the previously described ribs 52 and 54.

An attachment arm 14 corresponding to the previously described arm 14 is provided and the same has welded to the top thereof a pair of spaced and aligned bushings or bearings 124 and 126. The length and spacing of the latter correspond to the spacings between the ribs 118 and 120 and between ribs 120 and 122. For a reason presently to appear, the arm 123 has a slot 128 therethrough that corresponds in width to the spacing of and is disposed between the adjacent ends of the bearings 124 and 126.

As in the case of the unit 12, the ribs 118, 120 and 122 are provided with two sets of aligned openings such as the set indicated by the opening 130 in rib 122.

In mounting the arm 123 the bearings are aligned with one of such sets of openings and a headed bolt 132 is extended entirely therethrough to serve as a pivot pin parallel to the angle iron 112, and a nut 134 is threaded thereon and retained by a cotter pin 136.

The evident function of the slot 128 is the accommodation of the middle or central rib 120.

The mode of operation and the utility of the embodiment shown in FIGS. 5 and 6 do not require elaboration in the light of the discussion of the first described embodiment.

The actual scope of the invention is to be ascertained on perusal of the appended claims.

I claim:

1. In a harvesting machine of the type that includes a transversely extending sickle cutter means comprised of a reciprocating sickle knife operatively associated for cutting action with a series of laterally spaced and forwardly projecting sickle guard fingers, and wherein such series guard fingers is constituted of a plurality of sickle guard units that are each separately and detachably secured to the machine by mounting means, the combination therewith of an elongated and forwardly extending arm disposed below one of the guard units, and means independent of and spaced from the guard mounting means for detachably and pivotally securing the arm to said one guard unit for vertical swinging movement, whereby the arm can be secured to or detached from the guard unit before or after the latter is secured to the machine.

2. The combination of claim 1, wherein the last recited means includes one of the guard fingers having a depending medial rib that has a transverse opening therethrough that is disposed forwardly and below the guard unit mounting means.

3. The combination of claim 1, wherein the last recited means comprises one of said guard fingers and said arm having aligned openings therethrough, and a pivot pin extending through said aligned openings in parallelism with the extent of the sickle cutter means.

4. In a harvesting machine of the type that includes a transversely extending sickle cutter means comprised of a reciprocating sickle knife operatively associated for cutting action with a series of laterally spaced and forwardly projecting sickle guard fingers, said machine being provided with a support structure and a plurality of arms that extend forwardly of the sickle means from below the latter, mounting means for detachably and pivotally securing each of the arms independently to the support structure for limited vertical swinging movement, said mounting means comprising each of said arms having a portion thereof disposed between a pair of adjacent guard fingers, said portion of the arm and the pair of guard fingers having aligned openings therethrough, and a pivot pin removably extending through the aligned openings through the arm and the adjacent guard fingers.

5. The combination of claim 4, wherein said portion of the arm has a transverse dimension approximating the spacing of the adjacent pair of guard fingers.

6. The combination of claim 4, wherein said portion of the arm has a transverse dimension approximating the spacing of the adjacent pair of guard fingers, and means for releasably securing the pivot pin against inadvertent endwise dislodgment.

7. The combination of claim 4, wherein said arm includes a second portion disposed between one of said pair of guard fingers and another of the guard fingers immediately adjacent thereto, said second arm portion and said another guard finger having openings therethrough that are aligned with the previously mentioned openings, and said pivot pin extending through all of said openings.

8. The combination of claim 4, wherein said machine includes a component that is disposed in the path of the swinging movement of the arm and serves to limit downward swinging movement of the forward extent of the arm.

9. The combination of claim 4, wherein said machine includes a component that is disposed in the path of the swinging movement of the arm and serves to limit downward swinging movement of the forward extent of the arm, with the sickle knife being disposed respectively above and forwardly of said arm and said component.

10. The combination of claim 4, wherein said series of guard fingers is carried by a plurality of guard units, means for detachably mounting each of said guard units individually to said support structure, and said pair of adjacent guard fingers being carried by and integral with one of said guard units, whereby the arm can be detachably and pivotally mounted on the support structure without disturbing the detachable mounting of the guard unit.

11. The combination of claim 4, wherein said series of guard fingers is carried by a plurality of guard units, means for detachably mounting each of said guard units individually to said support structure, and said pair of adjacent guard fingers as well as said another guard finger being carried by and integral with one of said guard units, whereby the arm can be detachably and pivotally mounted on the support structure without disturbing the detachable mounting of the guard unit.

12. A unitary sickle guard unit comprising a plurality of parallelly spaced and forwardly projecting guard fingers joined integrally at their rear ends by a horizontally extending bar, said mounting bar being provided with integral means having spaced apertures therethrough for enabling the mounting of the unit on a horizontal support, and each of said guard fingers being provided with an integral medial rib depending therefrom, with said depending ribs having openings therethrough that are aligned in parallelism with and disposed at a height below that of the mounting bar.

13. The combination of claim 12, with an elongated arm disposed to project forwardly from a position below the top of the guard unit, and means inclusive of a pin extending through the aligned openings for pivotally connecting the arm to the guard unit for vertical swinging movement.

14. The combination of claim 12, wherein the medial ribs are provided with a second set of aligned openings in parallelism to the first mentioned openings.

15. The combination of claim 13, wherein the means for pivotally mounting the arm includes the arm being provided with apertured structure which receives the pin therethrough, and the said ribs and said apertured structure being so constructed and arranged that relative movement of the guard unit and the arm in the direction of the mounting bar is substantially denied.

16. The combination of claim 15, wherein the apertured structure slidably engages a pair of said ribs.

17. The combination of claim 12, wherein said medial rib has an upwardly and forwardly inclined lower edge generally merging toward the forward extremity of the guard finger from which it depends.

* * * * *